3,203,810
BLEACHING YELLOW CORN FLOUR
Ross J. Carey, Evansville, Ind., assignor to General Foods Corporation, White Plains, N.Y., a corporation of Delaware
No Drawing. Filed Oct. 29, 1963, Ser. No. 319,680
7 Claims. (Cl. 99—232)

This application is a continuation-in-part to my co-pending application Serial No. 137,538, filed September 12, 1961, which was a continuation-in-part of my application Serial No. 779,067, filed December 9, 1958, both now abandoned.

This invention relates to the bleaching of endosperm portions of yellow corn, typified by yellow corn flour.

As is well known to those skilled in the art, flour may be prepared from various grains, typically wheat, rye, and other cereal grains, as well as from corn. In accordance with more-or-less standard milling procedures, the raw grain during its course through the mill is separated into a portion known as the bran, which includes the brownish shell, the germ portion, and the endosperm portion, which includes flour. Flour commonly obtained from yellow corn possesses a yellow color, and because of this it has a rather limited market, although in many respects it compares favorably to white corn flour. Yellow corn flour cannot be used in connection with so-called quality products because these products have customarily been prepared from white corn flour.

Accordingly, endosperm portions of yellow corn, such as corn flour, have found a limited number of outlets, and this is reflected by the fact that the price of yellow corn flour is lower than the price of white corn flour. Although it has long been known that flours can be bleached to improve their color, it has not heretofore been economically possible to bleach yellow corn flour in the dry state to a satisfactory white product. The advantages of bleaching in the dry state are readily apparent; the numerous problems dependent upon handling the large quantities of water (which are present if wet bleaching is employed) are eliminated. Furthermore the bleaching operations in a dry bleaching technique require substantially little or no equipment in addition to that typically found within a dry corn mill. On the other hand, wet or slurry bleaching requires additional capital investment and high operating cost, which make it uneconomical for general use.

It is an object of this invention to provide a technique for dry state bleaching of endosperm portions of yellow corn. Other objects will be apparent to those skilled in the art on inspection of the following description.

In accordance with the present invention, a substantially white endosperm portion may be prepared from the yellow endosperm portion of yellow corn by treating the yellow endosperm portion with bleaching quantities of a source of available chlorine in an amount sufficient to produce a superficially dry, free-flowing mixture and bleach the yellow endosperm portion. The bleached endosperm portion is then treated with a liquid hydrogen peroxide bleach in bleaching quantities, thereby further bleaching the chlorine-treated endosperm and forming a white endosperm portion of yellow corn flour.

As stated, the prior art has not yet disclosed a dry bleaching technique which produces a bleached, yellow corn endosperm which can be substituted for white corn flour. Attempts to obtain a satisfactory product have included the treatment of flour with non-bleaching quantities of a chlorine-containing material, followed by a peroxide bleach. Such treatment has been disclosed in United States Patent No. 1,381,079 to Sutherland. However, the method disclosed in that patent produces flour which has a yellowish overcast and is easily visually identifiable as originating from yellow corn. A two-stage bleach as disclosed herein, on the other hand, yields a product which is substantially white, markedly whiter than that of the prior art.

The preferred raw materials which are to be bleached in accordance with the practice of this invention are portions of the endosperm obtained from raw, dried, yellow corn. These portions are commonly prepared by de-husking ears of corn and removing the kernels from the earth after they are dry. The dried kernels as cleaned and stored in a corn elevator will generally contain about 14%–16% moisture. Yellow corn flour may be separated therefrom by well known milling techniques, including various tempering and degerminating operations that separate out bran, germ, and finally the desired yellow endosperm portions. These yellow endosperm portions include hominy grits, standard meal, cream meal, corn flour, cones, etc. Except for its yellow color this endosperm portion is substantially equivalent to its counterpart obtained from white corn.

The yellow corn endosperm portions to be bleached may have a moisture content of about 9% to 18%, more typically 13% to 14%. Bleaching is effected by means of successive bleaching operations the first of which is a chlorine bleach and the second of which is a peroxide bleach. It has been determined that the order of the bleaching steps is an important factor in achieving a whiter product; reversal of the order of the chlorine and peroxide bleaching operations results in an unsatisfactory product.

The chlorine bleach of the endosperm portion is accomplished by treatment with a composition containing "available chlorine." By "available chlorine" is meant that chlorine which can be liberated from a composition so that it will be present for bleaching purposes. Sources of "available chlorine" include liquid hypochlorite bleach, chlorine gas, chlorine dioxide and phosphorus oxychloride. The particularly source of available chlorine has not been found to be critical.

In accordance with a preferred embodiment of my invention, the chlorine bleach is accomplished through a liquid hypochlorite solution typically obtained in the form of an aqueous solution of sodium hypochlorite containing 15% to 20%, say 18% available chlorine. With reference to hypochlorite bleach, the available chlorine would be that evolved on the addition of acid to the bleach solution. This hypochlorite bleach is added in an amount sufficient to produce a superficially dry, free-flowing mixture containing typically 2% to 7%, say 5% bleach per weight of yellow corn flour. Under these preferred conditions, the available chlorine in the flour is about 0.5% to 1.0% by weight. While larger quantities of hypochlorite bleach may be used, they give no appreciably greater bleaching effect. Typically the addition of bleach may be effected at room temperature, or about 60° to 80° F. The liquid bleach should not be added in such an amount that the mixture ceases to be free flowing, i.e., the total moisture in the mixture should not exceed about 20 to 25% by weight of the corn endosperm portion.

The superficially dry, free-flowing mixture of hypochlorite bleach and corn flour is preferably heated to a moderate temperature, i.e., 120° to 150° F., say 125° F., at which temperature it is maintained for 15 to 45 minutes, say 30 minutes, to effect a complete chlorine bleach. Although heating may be effected in the presence of live steam and with agitation, the mass within the vessel remains substantially dry and free flowing. Heating is accomplished under conditions such that the moisture content of the material remains substantially constant. It has been found that maintenance of these bleaching conditions for a period longer than 30 minutes provides no additional bleaching effect and may in fact yield a darker color. After the heating period has terminated, the bleached, flowable goods preferably are cooled to a temperature of 60° to 80° F.

Heating the flour-avilable chlorine mixture is effected for a dual purpose: (1) it accelerates the bleaching operation, and (2) it drives off all residual chlorine after bleaching has been accomplished. The last-mentioned effect of heating is especially important, because it appears that substantial amounts of residual chlorine have a deleterious effect on the efficiency of the subsequent peroxide bleach, chlorine tending to decompose peroxide and mitigate its bleaching action on corn flour.

The peroxide bleach may be accomplished by any composition which will liberate nascent oxygen in a quantity sufficient to effect a substantially complete bleaching of the endosperm portion. The material will commonly be liquid hydrogen peroxide, although other compositions that will perform the same function will be obvious to those working in the bleaching art.

Liquid peroxide bleaching agent, typically hydrogen peroxide in aqueous solution of 33% to 50%, say 50% concentration, is added to the chlorine-bleached flour in amount sufficient to yield about 1% to 5% by weight available peroxide and to form a superficially dry, free-flowing mixture. The mixture may be then heated to a high temperature, i.e., 150° to 210° F., say 200° F., at which temperature the mixture is maintained until peroxide bleaching is completed. This will typically be one to two hours, say one hour, under static conditions and a shorter time when agitation is employed. It will be apparent that the bleaching times will vary depending upon the charge material. The treated product is cooled after peroxide bleaching has been substantially fully effected. The yellow corn flour which has been bleached in accordance with the process of this invention is then essentially the equivalent of a white flour.

According to a specific example of this invention, 100 parts by weight of yellow corn flour containing 10% moisture was treated with five parts by weight of liquid hypochlorite (sodium hypochlorite) bleach containing 18% available chlorine at room temperature. The relatively dry, free-flowing mixture containing 0.5%–1% by weight available chlorine was agitated for 30 minutes at product temperature of 125° F. During this time, live atmospheric steam was added to the mixture of flour and bleach, the quantity of steam and the attendant temperature conditions being such that the resulting flour was free-flowing during the entire operation. After 30 minutes, the agitation was stopped, the flow of steam arrested and the bleached flour cooled.

One part by weight of liquid 50% hydrogen peroxide was added to the bleached flour. The substantially dry, free-flowing mixture was then heated to 200° F. and held at that temperature for two hours. The product which resulted from the two, separate bleaching operations had essentially the same appearance and properties as a white corn flour. It was markedly whiter than a product produced by following the teachings of U.S. Patent No. 1,381,079 to Sutherland.

The products prepared in accordance with this invention may be used in areas where other white flours find use, but where yellow flour is excluded because of color. Typical of such uses are as components of certain foods, adhesives, sizings, fillers and carriers.

Although the process of this invention has been described with reference to a specific embodiment, it is not to be limited thereto, but will include all obvious changes and modifications as will occur to those skilled in this art.

What is claimed is:

1. The method of preparing a white corn product, which comprises treating the endosperm portion of yellow corn with at least about 0.5% available chlorine per weight of said endosperm portion at a temperature and for a period of time sufficient to substantially completely chlorine bleach said portion while the endosperm portion-chlorine mixture is maintained in a superficially dry free flowing state, and then treating the chlorine-bleached portion with aqueous hydrogen peroxide solution in an amount, for a period of time and at a temperature sufficient to substantially completely peroxide-bleach said endosperm portion.

2. The method claimed in claim 1, in which the source of said available chlorine is liquid hypochlorite bleach.

3. The method of preparing a white corn product, which comprises treating the endosperm portion of yellow corn with at least about 0.5% available chlorine per weight of said endosperm portion at a temperature and for a period of time sufficient to substantially completely chlorine bleach said portion while the endosperm portion-chlorine mixture is maintained in a superficially dry free flowing state, removing substantially all the residual chlorine in said endosperm portion, and then treating the chlorine-bleached endosperm portion with an aqueous hydrogen peroxide solution in an amount, for a period of time and at a temperature sufficient to substantially completely peroxide bleach said endosperm portion.

4. The method of preparing a white corn product, which comprises treating the endosperm portion of yellow corn with at least about 0.5% available chlorine per weight of said endosperm portion for a period of time sufficient to substantially completely chlorine bleach said portion while the endosperm portion-chlorine mixture is maintained in a superficially dry free flowing state, heating said mixture to a temperature of about 120° to 150° F. to accelerate bleaching and for a period of time sufficient to drive off substantially all of the residual chlorine in said endosperm portion, and then treating the chlorine-bleached endosperm portion with aqueous hydrogen peroxide solution in an amount, for a period of time and at a temperature sufficient to substantially completely peroxide bleach said endosperm portion.

5. The method of preparing a white corn product, which comprises treating the endosperm portion of yellow corn with at least about 0.5% available chlorine per weight of said endosperm portion at a temperature and for a period of time sufficient to substantially chlorine bleach said portion while the endosperm portion-chlorine mixture is maintained in a superficially dry free flowing state, and then treating the chlorine-bleached endosperm portion with about 1 to 5% available peroxide from aqueous hydrogen peroxide solution per weight of endosperm portion at a temperature of about 150° to 210° F. for a period of time sufficient to substantially completely peroxide bleach said endosperm portion.

6. The method of preparing a white corn product, which comprises treating the endosperm portion of yellow corn with liquid hypochlorite bleach in an amount sufficient to yield about 0.5 to 1.0% available chlorine per weight of said endosperm portion at a temperature and for a period of time sufficient to substantially completely chlorine bleach said portion while the endosperm portion-chlorine mixture is maintained in a superficially dry free flowing state such that the moisture content of said mixture is not greater than about 20 to 25%, and then treating the chlorine-bleached endosperm portion with aqueous hydrogen peroxide solution in an amount sufficient to yield 1 to 5% available peroxide per weight of said endosperm portion at a temperature and for a period of time sufficient to substantially completely peroxide bleach said endosperm portion.

7. The method of preparing a white corn product, which comprises treating the endosperm portion of yellow corn with liquid hypochlorite bleach in an amount and for a period of time sufficient to yield about 0.5 to 1.0% available chlorine per weight of said endosperm portion at a temperature and for a period of time sufficient to substantially completely chlorine bleach said portion while the endosperm portion-chlorine mixture is maintained in a superficially dry free flowing state, heating said mixture to a temperature of about 120° to 150° F. for about 15 to 45 minutes to accelerate bleaching and drive off substantially all of the residual chlorine in said endosperm portion, and then treating the chlorine-bleached endosperm portion with aqueous hydrogen peroxide solution in an amount sufficient to yield about 1 to 5% available peroxide per weight of said endosperm portion to substantially completely peroxide bleach said endosperm portion, said peroxide bleach being carried out at a temperature of 150° to 210° F. for about 1 to 2 hours.

References Cited by the Examiner
UNITED STATES PATENTS

| | | | |
|---|---|---|---|
| 1,380,334 | 5/21 | Sutherland | 99—232 |
| 1,381,079 | 6/21 | Sutherland | 99—232 |
| 1,539,701 | 5/25 | Sutherland | 99—232 |
| 2,087,547 | 7/37 | Penn | 99—232 |
| 2,478,043 | 8/49 | Evans | 99—232 |
| 2,777,749 | 1/57 | Young | 99—232 |

A. LOUIS MONACELL, *Primary Examiner.*